(12) United States Patent
Kim et al.

(10) Patent No.: US 7,581,553 B2
(45) Date of Patent: Sep. 1, 2009

(54) DOMESTIC INJECTION TYPE ULTRASONIC WASHING APPARATUS

(75) Inventors: Ki Hun Kim, Seoul (KR); Seong Keun Lim, Seoul (KR); Hyun Chul Lee, Seoul (KR); Sang Wook Park, Seoul (KR)

(73) Assignee: Woongjin Coway Co., Ltd. (KR)

( * ) Notice: Subject to any disclaimer, the term of this patent is extended or adjusted under 35 U.S.C. 154(b) by 624 days.

(21) Appl. No.: 11/271,340

(22) Filed: Nov. 10, 2005

(65) Prior Publication Data

US 2006/0283488 A1 Dec. 21, 2006

(30) Foreign Application Priority Data

Jun. 17, 2005 (KR) ............. 10-2005-0052274

(51) Int. Cl.
*B08B 3/02* (2006.01)

(52) U.S. Cl. .................. 134/184; 134/198; 239/102.1

(58) Field of Classification Search ............ 134/198, 134/184, 182; 239/102.1
See application file for complete search history.

(56) References Cited

U.S. PATENT DOCUMENTS

| | | | | |
|---|---|---|---|---|
| 2,980,123 | A * | 4/1961 | Lemelson | 134/184 |
| 3,983,740 | A * | 10/1976 | Danel | 73/12.11 |
| 4,546,920 | A * | 10/1985 | Torgersen | 239/102.2 |
| 5,540,245 | A * | 7/1996 | Munakata et al. | 134/76 |
| 5,927,306 | A * | 7/1999 | Izumi et al. | 134/155 |
| 6,241,162 | B1 * | 6/2001 | Takahashi et al. | 239/102.2 |
| 6,260,562 | B1 * | 7/2001 | Morinishi et al. | 134/57 R |

FOREIGN PATENT DOCUMENTS

| | | | |
|---|---|---|---|
| JP | 58-139757 | * | 8/1983 |
| JP | 64-38183 A | | 2/1989 |
| JP | 09-069506 | * | 3/1997 |
| JP | 10-239191 | * | 9/1998 |
| JP | 2000-140779 | * | 5/2000 |
| JP | 2000-246199 | | 9/2000 |
| JP | 2001-162239 | * | 6/2001 |
| JP | 2003-340387 A | | 12/2003 |

* cited by examiner

*Primary Examiner*—Frankie L Stinson
(74) *Attorney, Agent, or Firm*—Perkins Coie LLP

(57) ABSTRACT

Disclosed herein is a domestic injection-type ultrasonic washing apparatus comprising an oscillator module and an injector module. The oscillator module includes an oscillation circuit unit provided with various elements to generate electric vibration, ultrasonic vibrators located underneath the oscillation circuit unit and electrically connected to the oscillation circuit unit to convert the electric vibration to mechanical vibration, and a radiation plate having vibrator seating openings. The injector module includes a raw water inlet portion, a fluid passage housing having an inner fluid passage to allow inlet raw water to pass while coming into contact with the radiation plate, and injection nozzles to ultrasonically vibrate and inject the raw water. The washing apparatus achieves reduction in the size thereof, and ease of assembly, repair and exchange of damaged modules. Also, the washing apparatus shows improved radiation effect and uniform supply of wash water.

17 Claims, 14 Drawing Sheets

(a)

(b)

(a)

(b)

DOMESTIC INJECTION TYPE ULTRASONIC WASHING APPARATUS

RELATED APPLICATIONS

The present application is based on, and claims priority from, Korean Application Number 2005-52274, filed on Jun. 17, 2005, the disclosure of which is incorporated by reference herein in its entirety.

BACKGROUND OF THE INVENTION

1. Field of the Invention

The present invention relates to an ultrasonic washing apparatus, and, more particularly, to a domestic injection-type ultrasonic washing apparatus which is designed to ultrasonically vibrate and inject inlet raw water to thereby wash fruits, vegetables, dishes, etc.

2. Description of the Related Art

In general, an ultrasonic washing technique mainly utilizes cavitation induced by ultrasonic energy, particulate atomization, or acceleration of water particles.

The cavitation is a phenomenon that fine bubbles are formed and collapsed under the influence of an ultrasonic pressure when ultrasonic energy is propagated in a solution, resulting in shock waves with high pressure and temperature. The resulting shock waves enable even deep interior portions of an object, immersed in the solution, to be washed within a short time. Actually, in addition to the shock energy caused by the cavitation, agitating action caused by a radiation pressure of ultrasonic waves, thermal action, etc. induce synergism with detergent, resulting in outstanding washing effects.

When the ultrasonic energy is applied to running water streams, further, an acceleration force of water particles is increased by capillary waves. Using the increased acceleration force enables washing of minute particles, such as agricultural medicines or foreign substances adhered to the object being washed. Furthermore, the ultrasonic washing technique is effective to eliminate the recontamination risk of the washed object, and to minimize damage to the object being washed. For this reason, the ultrasonic washing technique has been conventionally applied in the precision washing of semiconductors, etc.

Recently, to more completely remove foreign substances adhered to fruits, vegetables, or dishes (hereinafter, referred to as "object being washed") with a reduced amount of water, domestic injection-type ultrasonic washing apparatuses, which are designed to ultrasonically vibrate wash water being injected, have been developed.

The injection-type ultrasonic washing apparatuses comprise an oscillator device in which ultrasonic vibrators and various elements to oscillate the ultrasonic vibrators are mounted, and an injector device to ultrasonically vibrate and inject inlet raw water. Based on whether the oscillator device and the injector device are integrally formed with each other or are separated from each other, the injection-type ultrasonic washing apparatuses are classified into integral-type ones and discrete-type ones.

FIG. 1 is a schematic sectional view illustrating an injection-type ultrasonic washing apparatus having a discrete structure according to the prior art.

As shown in FIG. 1, the injection-type ultrasonic washing apparatus 10 of the prior art having a discrete structure comprises a housing 11 containing various elements therein, an ultrasonic oscillation circuit unit 16 to generate electric vibration, an ultrasonic vibrator 12 to convert the high-frequency electric vibration into mechanical vibration, an input cord 13 to which exterior power and operating signals are applied to drive the ultrasonic vibrator 12, a protector 15 to prevent breakage of a coaxial cable 14 of the input cord 13, a gasket 19 fitted around the ultrasonic vibrator 12 to prevent leakage of wash water from a water reservoir 21, a metal plate 17 used as a terminal to transmit the power from the ultrasonic oscillation circuit unit 16 to the ultrasonic vibrator 12, a heat sink 18 to absorb heat generated in the vibrator 12, a raw water inlet portion 20 to introduce raw water, i.e. wash water, from an exterior source into the water reservoir 21, the water reservoir 21 serving to store a predetermined amount of the raw water sufficient for concentrative irradiation of ultrasonic waves, and an injection nozzle 22 to inject the ultrasonically vibrating wash water.

In the above-described injection-type ultrasonic washing apparatus 10 having a discrete structure, the oscillation circuit unit 16 is separated from an oscillator device 25, requiring a separate mounting space therefore.

The greater the distance between the oscillation circuit unit 16 and the oscillator device 25 is, the greater the deterioration in the transmission of driving voltage and driving signals. This results in low oscillation efficiency in spite of the use of the coaxial cable, and increases manufacturing costs of the washing apparatus.

FIG. 2 is a schematic sectional view illustrating an injection-type ultrasonic washing apparatus having an integral structure according to the prior art.

As shown in FIG. 2, the injection-type ultrasonic washing apparatus 30 having an integral structure comprises a main passage 31 to guide raw water introduced from a raw water inlet portion 39, branch passages 32 diverged from the main passage 31 to guide the raw water into a plurality of injection nozzles, the injection nozzles 33 designed to temporarily store the raw water and to inject it to the outside, ultrasonic vibrators 34 to apply an ultrasonic vibrational energy to the raw water, one or more gaskets 35 provided between the ultrasonic vibrators 34 to prevent leakage of the raw water, an oscillation circuit unit 36 containing various elements therein to produce driving signals required to drive the ultrasonic vibrators 34 upon receiving exterior power, buffers 37 provided between frictional surfaces of the injection nozzles 33 and a housing 38, and a power line unit 40 to transmit the driving signals from the oscillation circuit unit 36 to the ultrasonic vibrators 34.

The power line unit 40 includes a coaxial cable 41 to attenuate vibration of the ultrasonic vibrators 34, an insulation cap 42, and a spacer 43 to adjust a distance between the coaxial cable 41 and the insulation cap 42 while supporting the coaxial cable 41.

The above-described injection-type ultrasonic washing apparatus 30 having an integral structure has the following problems.

Firstly, although the oscillation circuit unit 36 is integrally provided in the washing apparatus 30 to thereby eliminate the necessity of a separate mounting space thereof differently from the discrete-type ultrasonic washing apparatus 10, it excessively increases the volume of the washing apparatus 30, making it difficult to mount the washing apparatus 30 to a general domestic sink.

Secondly, the oscillation circuit unit 36 is remote from the ultrasonic vibrators 34, still requiring the use of the coaxial cable 41 to attenuate the vibration of the ultrasonic vibrators 34.

Thirdly, since the branch passages 32 to supply the raw water to the injection nozzles 33 are arranged on a lateral side of the injection nozzles 33, a vortex is generated in the injection nozzles 33, making uniform transmission of ultrasonic vibrational energy impossible. This causes bending of water streams injected from the injection nozzles 33, resulting in a reduction in the transmission distance of the vibrational energy.

Fourthly, the oscillation circuit unit 36 has no radiation function, and also has a complicated structure, suffering from a difficulty in repair and exchange of damaged oscillator and injector devices thereof.

SUMMARY OF THE INVENTION

Therefore, the present invention has been made in view of the above problems, and it is an object of the present invention to provide a domestic injection-type ultrasonic washing apparatus in which an oscillation circuit unit and a wash water injector device thereof have a modular structure, thereby achieving reduction in the size thereof.

It is another object of the present invention to provide a domestic injection-type ultrasonic washing apparatus which has a minimized distance between an oscillation circuit unit and ultrasonic vibrators, thereby minimizing deterioration in the transmission of driving voltage and signals to achieve improved oscillation efficiency, and reducing manufacturing costs of the washing apparatus through the use of a general electric wire instead of a coaxial cable.

It is a further object of the present invention to provide a domestic injection-type ultrasonic washing apparatus, which adopts modular elements, thereby achieving a simplified assembly structure and ease of repair and exchange of damaged elements as well as ease in the tuning of vibrators and an oscillation circuit unit thereof.

It is another object of the present invention to provide a domestic injection-type ultrasonic washing apparatus, which can achieve improved radiation efficiency and stable injection of wash water.

It is yet another object of the present invention to provide a domestic injection-type ultrasonic washing apparatus which can easily radiate heat generated in an oscillation circuit unit thereof.

In accordance with a first aspect of the present invention, the above and other objects can be accomplished by the provision of a domestic injection-type ultrasonic washing apparatus comprising: an oscillator module including an oscillation circuit unit having various elements electrically connected to an exterior power source to generate electric vibration, ultrasonic vibrators located underneath the oscillation circuit unit and electrically connected to the oscillation circuit unit to convert the electric vibration to mechanical vibration, and a radiation plate having vibrator seating openings for the mounting of the ultrasonic vibrators; and an injector module mounted underneath the oscillator module, the injector module including a raw water inlet portion for the introduction of exterior raw water, a fluid passage housing having a predetermined inner space, at least part of an upper portion of the fluid passage housing being opened to define an inner fluid passage, through which the raw water, introduced from the raw water inlet portion, passes while coming into contact with the radiation plate, and injection nozzles mounted in nozzle seating openings of the fluid passage housing beneath the ultrasonic vibrators and adapted to inject the raw water, passed through the inner fluid passage, to the outside.

Preferably, the injector module may have two or more injection nozzles, and the oscillator module may have the vibrators positioned above the injection nozzles to correspond to the injection nozzles, respectively.

Preferably, each of the injection nozzles may have a plurality of injection holes, and each of the vibrators may have a plurality of electrodes each having a center point that corresponds to a center portion of each injection hole for the uniform dispersion of ultrasonic energy.

Preferably, the oscillator module may be provided with sealing members at connector portions thereof to be connected to the injector module to achieve water-tightness relative to the injector module.

Preferably, at least one of radiating elements, provided at the oscillation circuit unit, may come into contact with the radiation plate.

Preferably, the fluid passage housing may have partitions having a predetermined height around the nozzle seating openings, so that the raw water, introduced from the raw water inlet portion, gradually fills the fluid passage housing from a bottom surface of the housing, and then, overflows the partitions to thereby be introduced into the injection nozzles.

Preferably, channels may be formed at upper ends of the partitions to increase a flow rate of the raw water to be introduced into the injection nozzles.

Preferably, the fluid passage housing or each injection nozzle may have fluid passage stabilizing guides to stabilize the flow of the raw water to be introduced into the fluid passage housing or the injection nozzle.

Preferably, the fluid passage housing may include: an upper housing formed with openings at locations beneath the vibrators; and a lower housing formed with the nozzle seating openings beneath the vibrators.

In accordance with a second aspect of the present invention, the above and other objects can be accomplished by the provision of a domestic injection-type ultrasonic washing apparatus comprising: an oscillation circuit unit having various elements electrically connected to an exterior power source to generate electric vibration; ultrasonic vibrators located underneath the oscillation circuit unit and electrically connected to the oscillation circuit unit to convert the electric vibration to mechanical vibration; a radiation plate having vibrator seating openings for the mounting of the ultrasonic vibrators; a fluid passage housing having a predetermined inner space, at least part of an upper portion of the fluid passage housing being opened to define an inner fluid passage, through which inlet raw water from the outside passes while coming into contact with the radiation plate; and injection nozzles mounted in nozzle seating openings of the fluid passage housing beneath the ultrasonic vibrators and adapted to inject the raw water, passed through the inner fluid passage, to the outside.

Preferably, two or more injection nozzles may be provided, and the vibrators may be positioned above the injection nozzles to correspond to the injection nozzles, respectively.

Preferably, each of the injection nozzles may have a plurality of injection holes, and each of the vibrators may have a plurality of electrodes each having a center point that corresponds to a center portion of each injection hole for the uniform dispersion of ultrasonic energy.

Preferably, at least one of radiating elements, provided at the oscillation circuit unit, may come into contact with the radiation plate.

Preferably, the fluid passage housing may have partitions having a predetermined height around the nozzle seating openings, so that the raw water, introduced from a raw water inlet portion, gradually fills the fluid passage housing from a bottom surface of the housing, and then, overflows the partitions to thereby be introduced into the injection nozzles.

Preferably, the fluid passage housing or each injection nozzle may have fluid passage stabilizing guides to stabilize the flow of the raw water to be introduced into the fluid passage housing or the injection nozzle.

Preferably, channels may be formed at upper ends of the partitions to increase a flow rate of the raw water to be introduced into the injection nozzles.

In accordance with a third aspect of the present invention, the above and other objects can be accomplished by the provision of a domestic injection-type ultrasonic washing apparatus comprising an oscillation circuit unit having various elements connected to an exterior power source to generate electric vibration, ultrasonic vibrators electrically connected to the oscillation circuit unit to convert the electric vibration to mechanical vibration, and injection nozzles to ultrasonically vibrate and inject inlet raw water, further comprising: a radiation plate having vibrator seating openings for the mounting of the ultrasonic vibrators and adapted to come into contact with radiating elements of the oscillation circuit unit; and a fluid passage housing having an inner fluid passage, through which the inlet raw water from the outside passes while coming into contact with the radiation plate.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, a preferred embodiment of the present invention will be explained with reference to the accompanying drawings.

Figure 1:
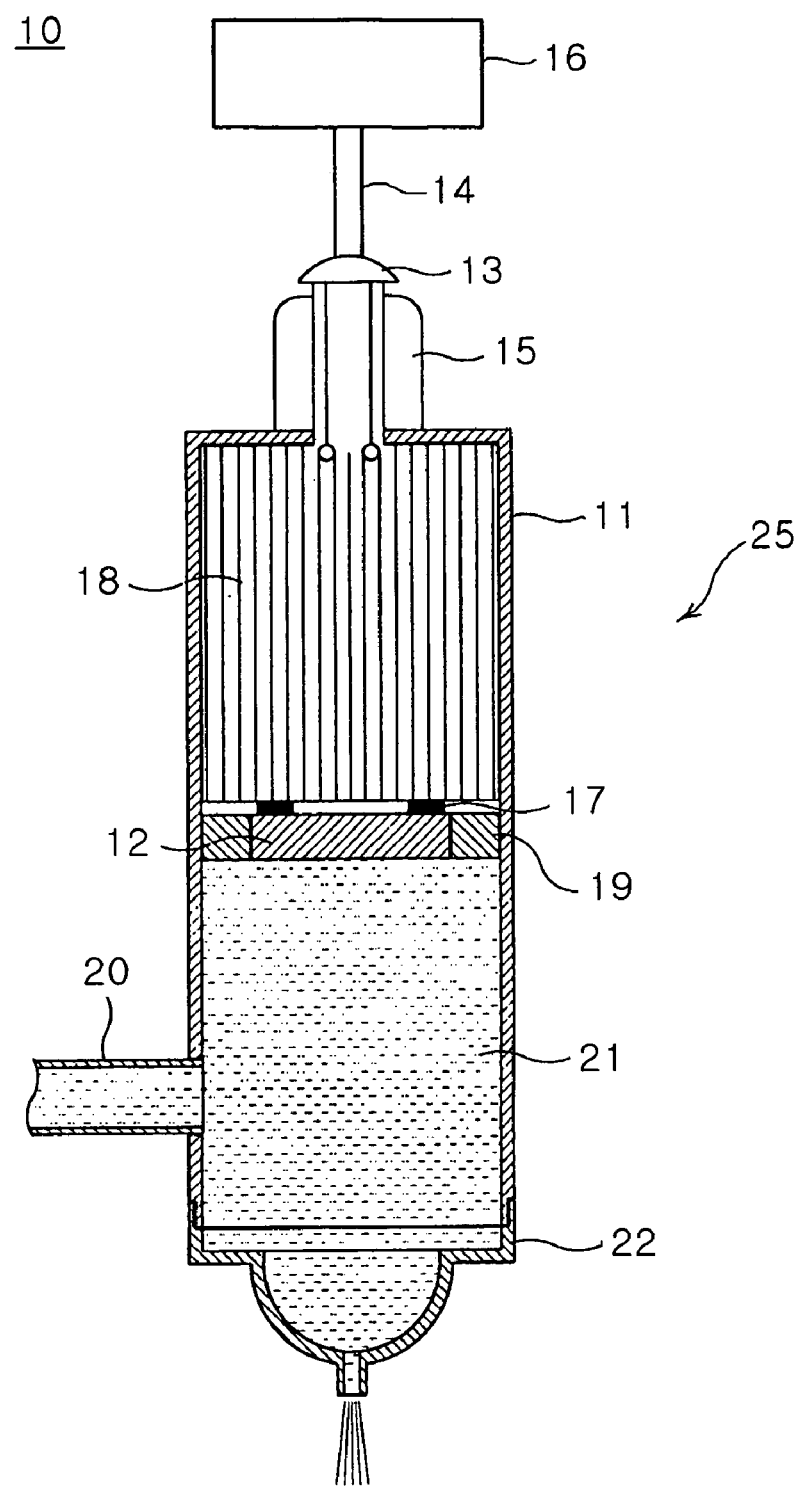
FIG. 1 is a schematic sectional view illustrating an injection-type ultrasonic washing apparatus having a discrete structure according to the prior art.
Figure 2:
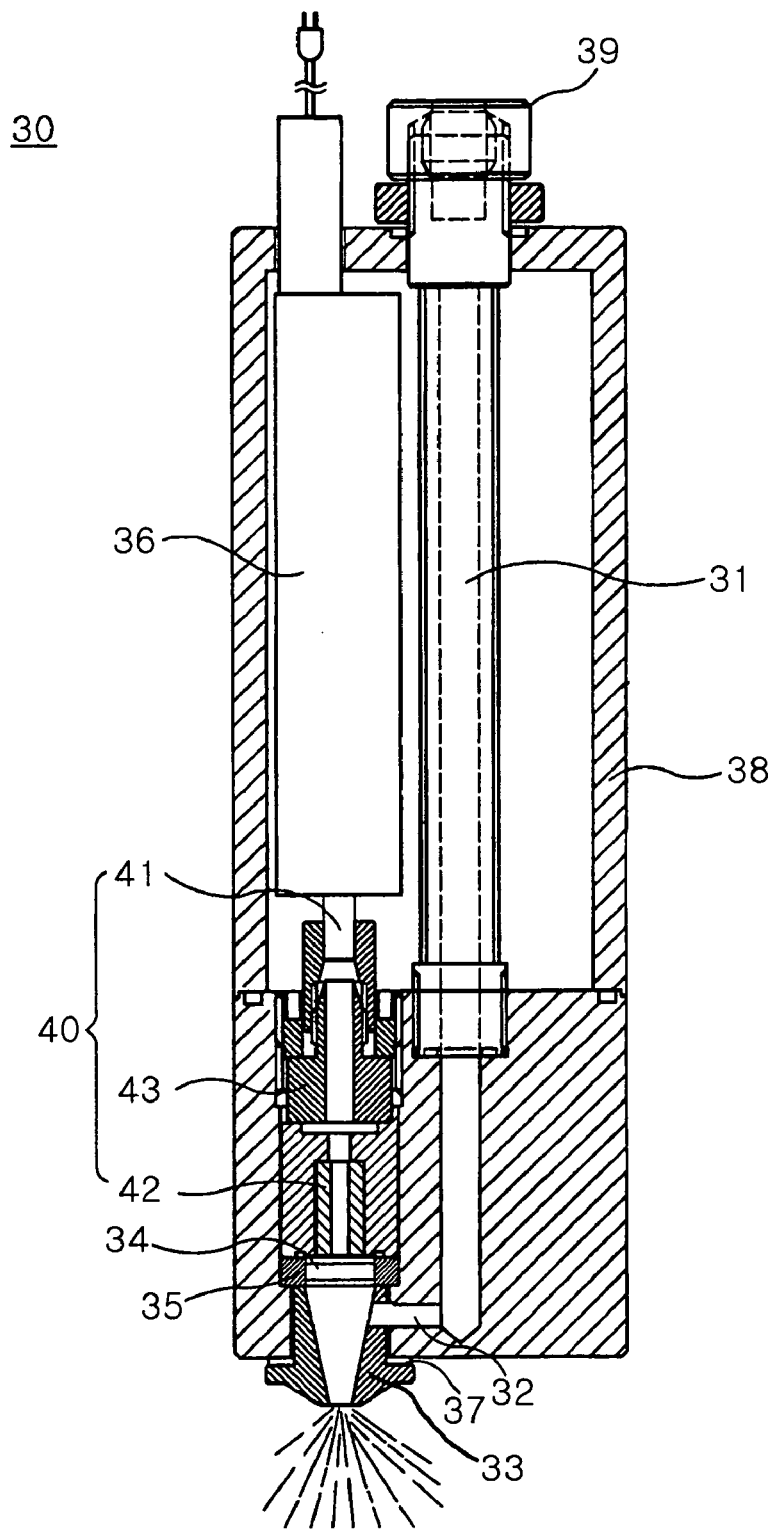
FIG. 2 is a schematic sectional view illustrating an injection-type ultrasonic washing apparatus having an integral structure according to the prior art.
Figure 3:
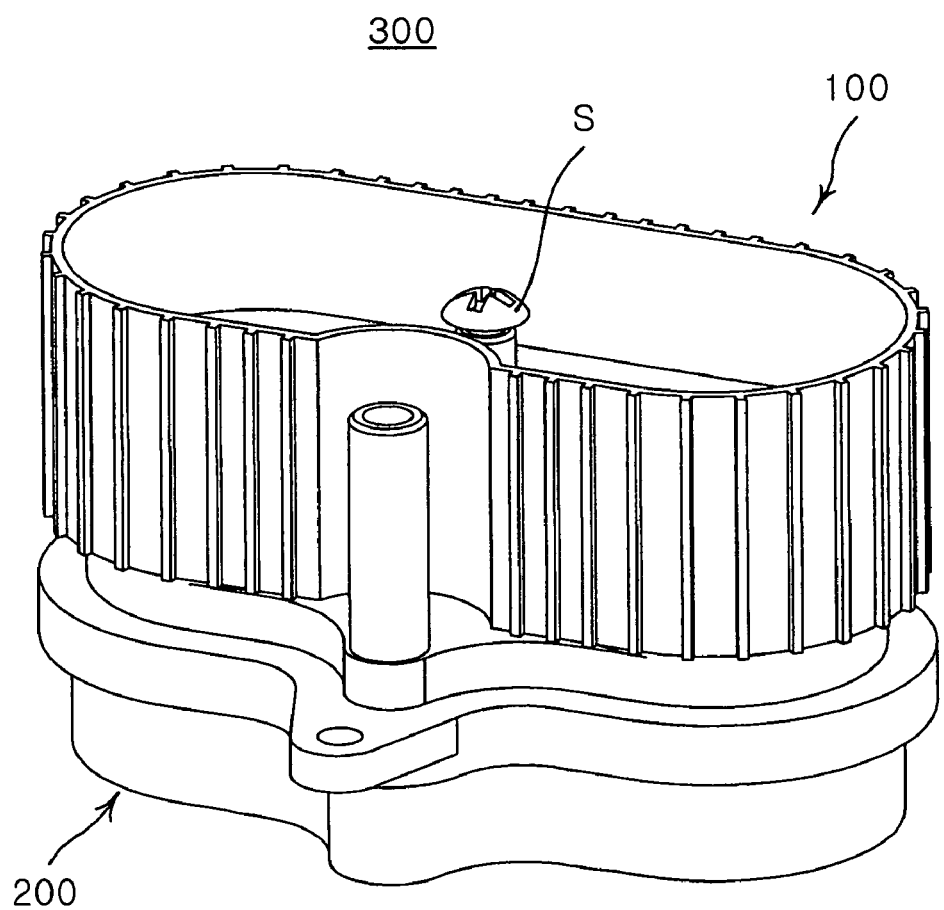
FIG. 3 is a perspective view illustrating a domestic injection-type ultrasonic washing apparatus according to an embodiment of the present invention.
Figure 4:
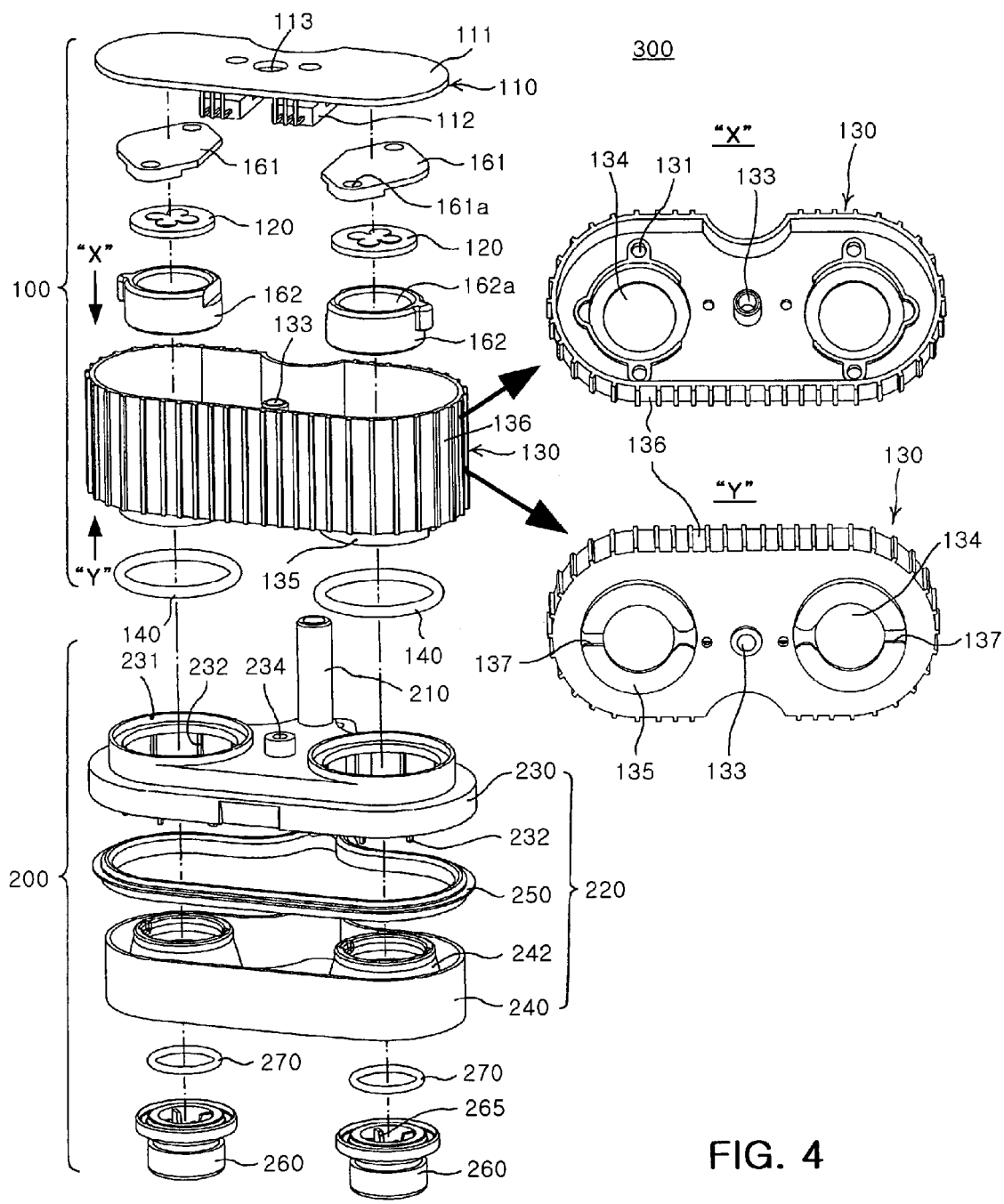
FIG. 4 is an exploded perspective view of the domestic injection-type ultrasonic washing apparatus of FIG. 3.
Figure 5:
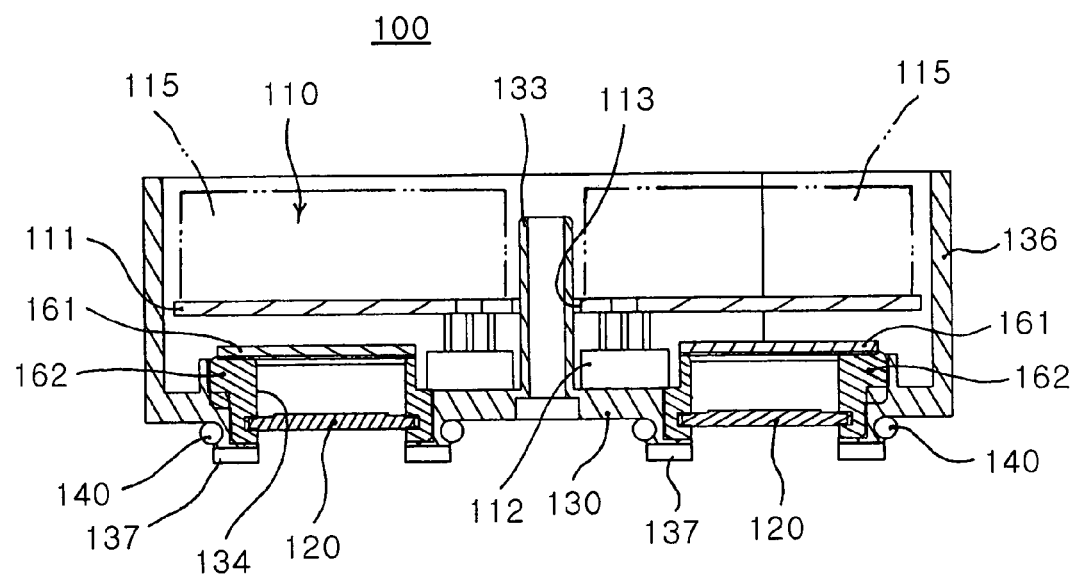
FIG. 5 is a longitudinal sectional view illustrating an oscillator module according to the embodiment of the present invention.
Figure 6:
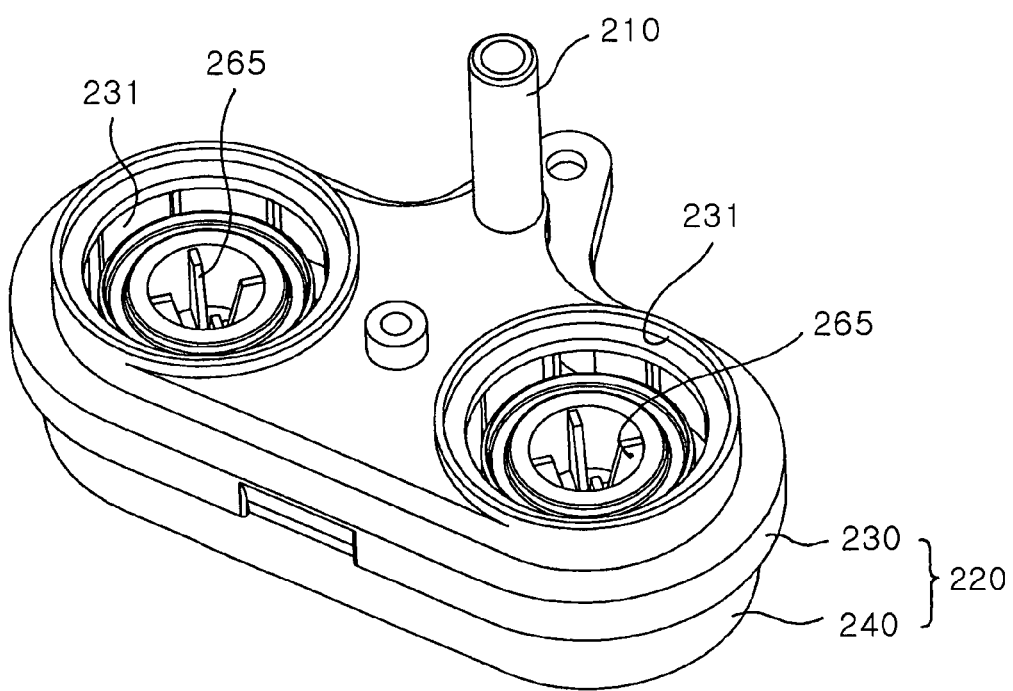
FIG. 6 is a perspective view illustrating an injector module according to the embodiment of the present invention.
Figure 7:
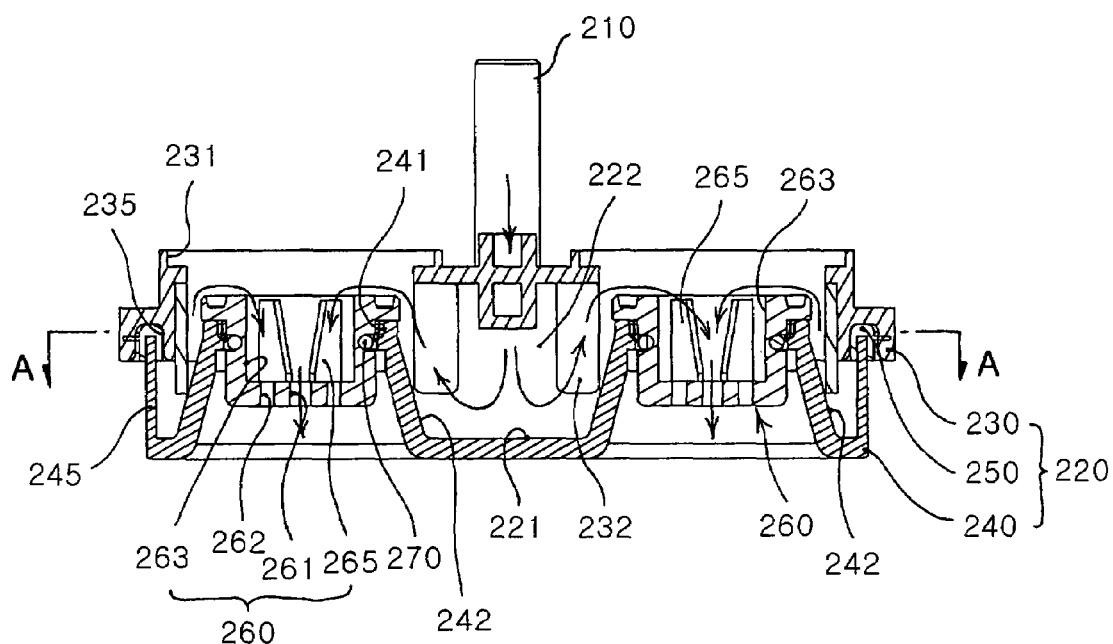
FIG. 7 is a longitudinal sectional view of the injector module of FIG. 6.
Figure 8:
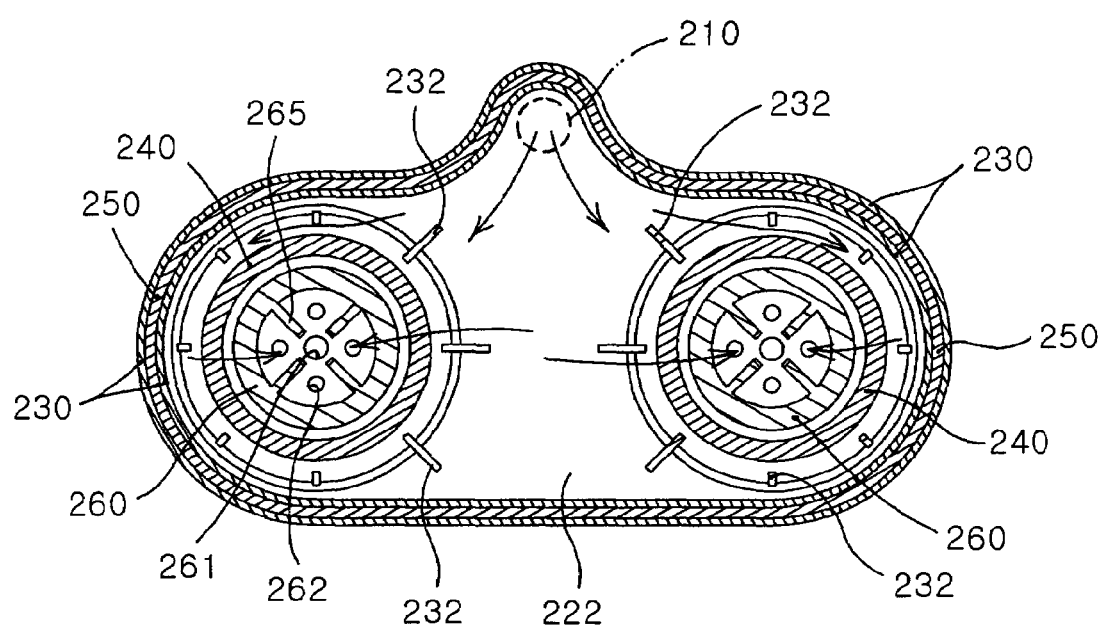
FIG. 8 is a cross sectional view of the injector module taken along the line A-A of FIG. 7.
Figure 9:
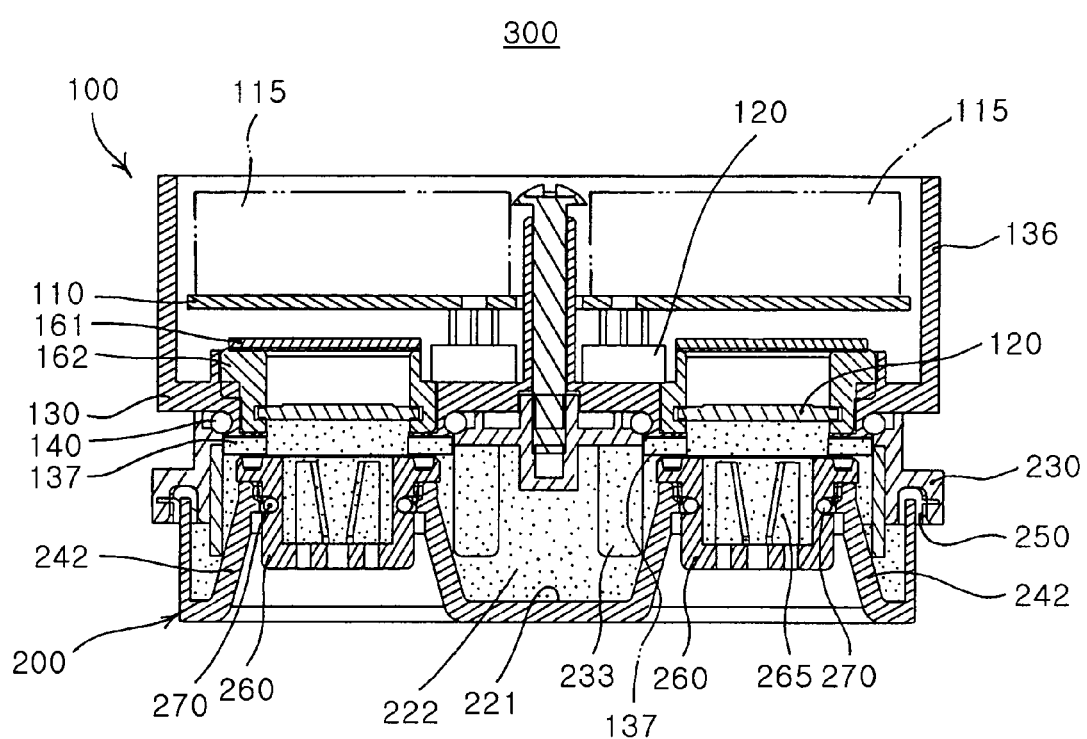
FIG. 9 is a longitudinal sectional view illustrating the domestic injection-type ultrasonic washing apparatus according to the embodiment of the present invention.

FIG. 3 is a perspective view illustrating a domestic injection-type ultrasonic washing apparatus according to an embodiment of the present invention. FIG. 4 is an exploded perspective view of the domestic injection-type ultrasonic washing apparatus of FIG. 3. FIG. 5 is a longitudinal sectional view illustrating an oscillator module according to the embodiment of the present invention. FIG. 6 is a perspective view illustrating an injector module according to the embodiment of the present invention. FIG. 7 is a longitudinal sectional view of the injector module of FIG. 6. FIG. 8 is a cross sectional view of the injector module taken along the line A-A of FIG. 7. FIG. 9 is a longitudinal sectional view illustrating the domestic injection-type ultrasonic washing apparatus according to the embodiment of the present invention.

Figure 10:
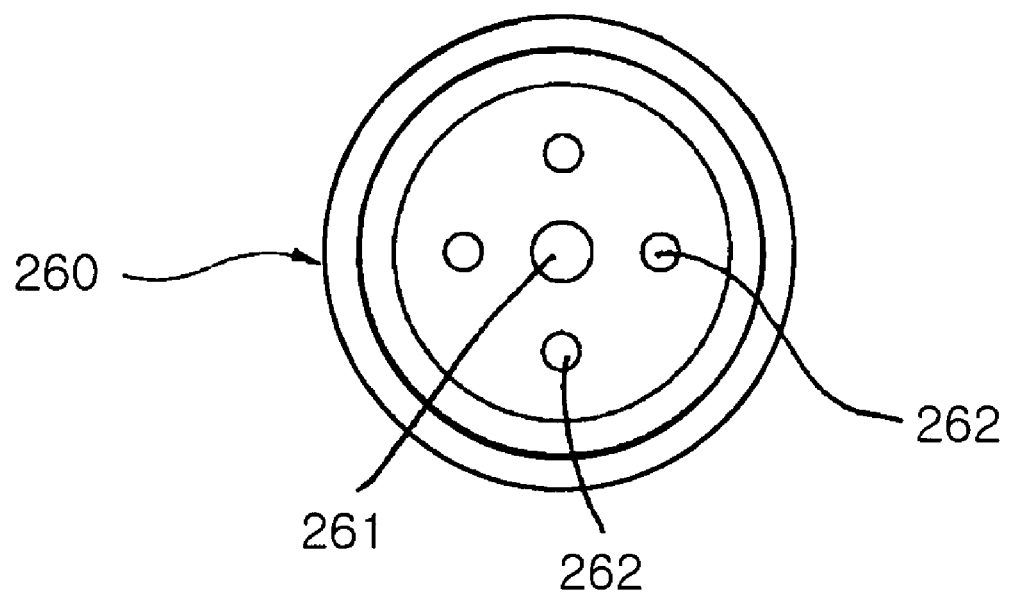
FIG. 10 is a plan view illustrating an injection nozzle according to the embodiment of the present invention.
Figure 12:
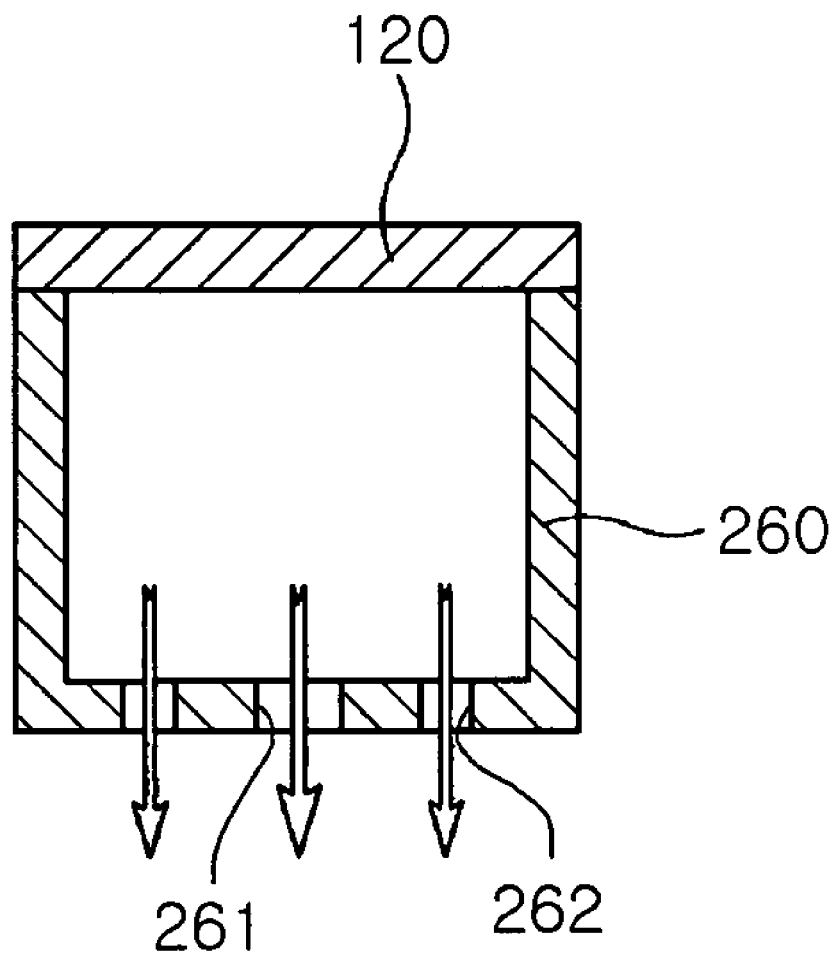
FIG. 12 is a sectional view illustrating the operation of the ultrasonic vibrator according to the embodiment of the present invention.
Figure 13:
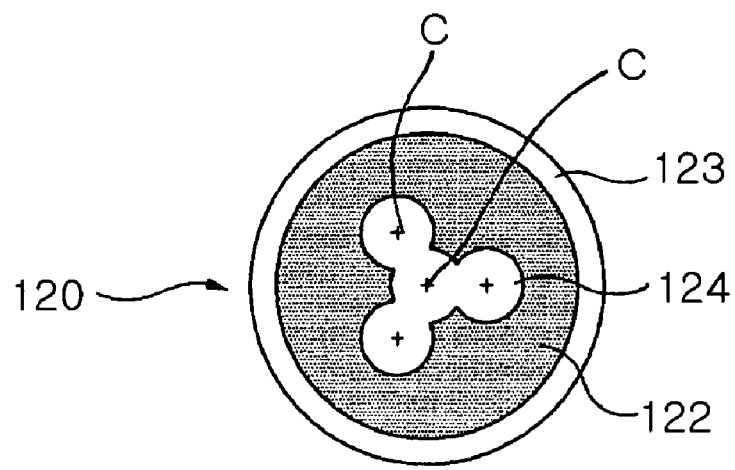
FIGS. 13a and 13b are plan views illustrating an ultrasonic vibrator and an injection nozzle according to another embodiment of the present invention.
Figure 13:
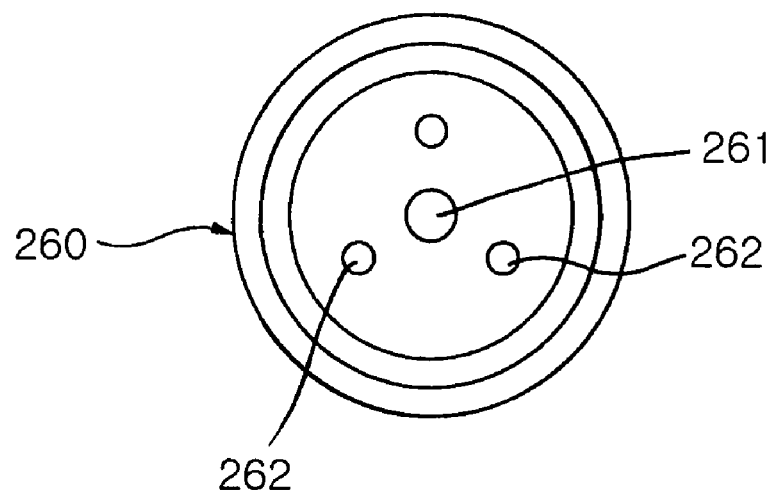
Figure 14:
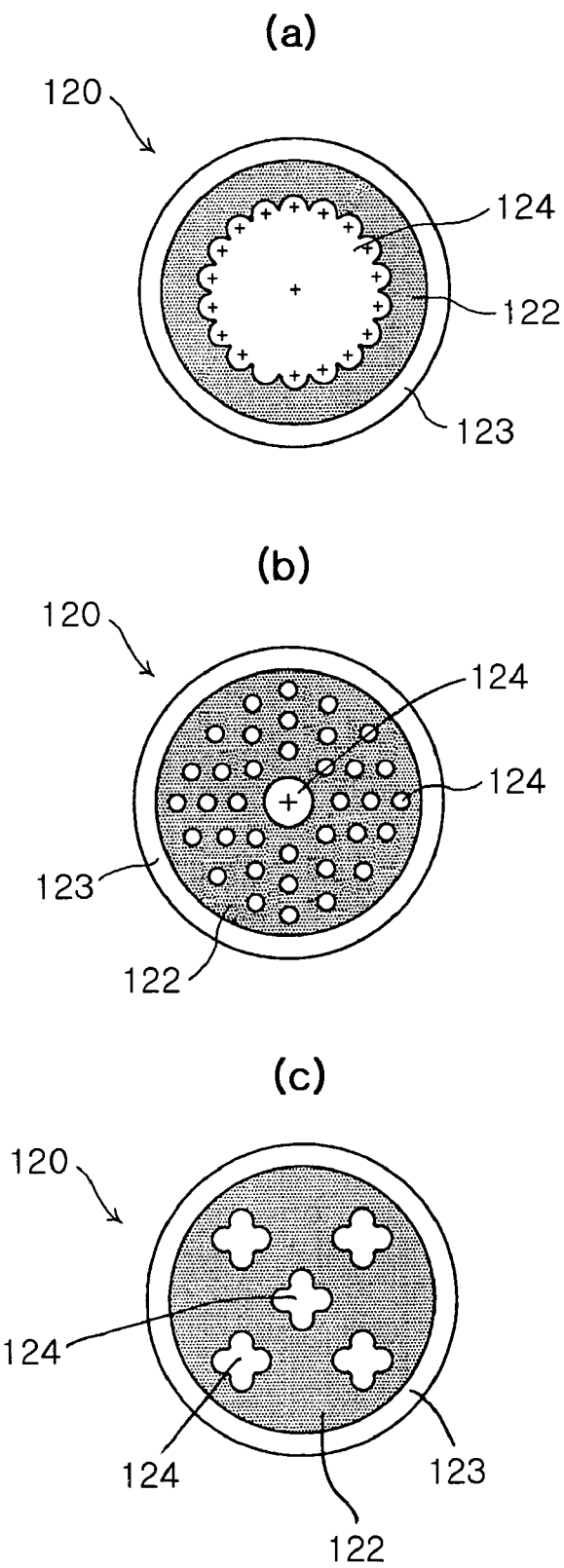
FIGS. 14a to 14c are plan views illustrating different ultrasonic vibrators according to other embodiments of the present invention.

Also, FIG. 10 is a plan view illustrating an injection nozzle according to the embodiment of the present invention. FIGS. 11a and 11b are a plan view and a longitudinal sectional view illustrating an ultrasonic vibrator according to the embodiment of the present invention. FIG. 12 is a sectional view illustrating the operation of the ultrasonic vibrator according to the embodiment of the present invention. FIGS. 13a and 13b are plan views illustrating an ultrasonic vibrator and an injection nozzle according to another embodiment of the present invention. FIGS. 14a to 14c are plan views illustrating different ultrasonic vibrators according to other embodiments of the present invention.

As shown in FIG. 3, the injection-type ultrasonic washing apparatus 300 according to the present invention comprises an oscillator module 100, and an injector module 200 mounted underneath the oscillator module 100. Both the oscillator module 100 and the injector module 200 are separably coupled to each other by means of known fastening means, such as a screw S.

Hereinafter, the configuration of the oscillator module 100 will first be explained in detail with reference to FIGS. 4 and 5.

The oscillator module 100 includes an oscillation circuit unit 110, ultrasonic vibrators 120 located underneath the oscillation circuit unit 110, and a radiation plate 130 configured to receive the oscillation circuit unit 110 and formed with vibrator seating openings 134 for the mounting of the ultrasonic vibrators 120.

The oscillation circuit unit 110 serves to generate high-frequency electric vibration by making use of elements mounted therein when exterior power is applied thereto. The oscillation circuit unit 110 is connected to a separate controller (not shown) to operate under control of the not shown controller.

The oscillation circuit unit 110 includes a plurality of elements 112 and 115 mounted at upper and/or lower surfaces of a substrate 111. The elements include radiating elements, such as transistors 112. The substrate 111 is perforated with a through-hole 113 for use in the coupling between the oscillator module 100 and the injector module 200.

The ultrasonic vibrators 120 are located underneath the oscillation circuit unit 110 and are electrically connected to the oscillation circuit unit 110 to generate ultrasonic vibrational energy, i.e. mechanical vibrational energy.

Generally, the ultrasonic vibrators 120 may have circular electrodes, but the present invention is not limited thereto. As will be explained hereinafter, the shape of the electrodes is variable to correspond to the shape of injection holes 261 and 262 of injection nozzles 260 (See FIGS. 10 to 13).

The ultrasonic vibrators 120 are electrically connected to the oscillation circuit unit 110 immediately thereunder with a minimized distance between the oscillation circuit unit 110 and the ultrasonic vibrators 120. This configuration of the present invention minimizes deterioration in the transmission of driving voltage and signals, achieving improved oscillation efficiency. Also, the present invention is designed to utilize a general electric wire instead of a coaxial cable, achieving reduced manufacturing costs.

The radiation plate 130 has a circumferential wall portion 136, which defines a predetermined interior space to receive the oscillation circuit unit 110 and the ultrasonic vibrators 120. The vibrator seating openings 134 are formed at the bottom of the radiation plate 130 so that the ultrasonic vibrators 120 are seated thereon.

To keep the ultrasonic vibrators 120, that come into contact with the raw water, in a water-tight state, as shown in FIGS. 4 and 5, each ultrasonic vibrator 120 is seated in an interior space 162a of a vibrator gasket 162. After all the ultrasonic vibrators 120 are seated in the corresponding vibrator gaskets 162, the vibrator gaskets 162 are mounted on the respective vibrator seating openings 134 by means of vibrator fixing plates 161 having fastening holes 161a. Screws are fastened through the fastening holes and screwing holes 131 formed around the vibrator seating openings 134. Admittedly, it should be understood that the mounting method of the ultrasonic vibrators 120 is not limited to the above description, and other known fastening means may be used.

Preferably, the radiation plate 130 is configured to come into contact with the raw water as will be explained hereinafter in order to radiate heat generated in the oscillation circuit unit 110 in a water cooling manner.

To maximize the radiation effect, in particular, at least one of the radiating elements, such as transistors 112, of the oscillation circuit unit 110 may be configured to come into contact with the radiation plate 130 to realize conductive heat transfer. This configuration is effective to achieve improved radiation effect through the use of heat conduction and water cooling.

As stated above, the circumferential wall portion 136 of the radiation plate 130 defines the predetermined space to receive the oscillation circuit unit 110 and the ultrasonic vibrators 120. Referring to FIG. 4, the circumferential wall portion 136 is formed as an integral part of the radiation plate 130, but the present invention is not limited thereto. Alternatively, the circumferential wall portion 136 may be formed as a separate member to thereby be coupled to the radiation plate 130.

Reference numeral 133 denotes a fastening member having internal threads. The fastening member 133 is used to screw the oscillator module 100 to the injector module 200.

Preferably, to keep the oscillator module 100 and the injector module 200 in a water-tight state, sealing members 140 may be inserted around connector portions 135 of the oscillator module 100, respectively. Here, the connector portions 135 are used to connect the oscillator module 100 to the injector module 200.

Next, the injector module 200 will be explained with reference to FIGS. 4 to 8.

The injector module 200 is located underneath the oscillator module 100. The injector module 200 includes a raw water inlet portion 210 for the introduction of raw water from the outside, a fluid passage housing 220 internally formed with a fluid passage to pass the raw water introduced from the raw water inlet portion 210, and injection nozzles 260 to inject the raw water, passed through the inner fluid passage, to the outside.

The raw water inlet portion 210 may be directly connected to a water tap of a domestic sink. However, to achieve uniform transmission of ultrasonic vibrational energy via a medium, it is preferable that the raw water inlet portion 210 is configured to communicate with a controller (not shown), which has a feed valve and a flow-rate control valve in order to introduce the raw water at a constant flow rate and pressure.

In this case, the controller (not shown) may have known filter means to supply clean water to the raw water inlet portion 210.

As shown in FIGS. 4 to 8, the fluid passage housing 220 has a predetermined interior space 222 to define the inner fluid passage to pass the raw water.

In the embodiment of the present invention, as shown in FIGS. 4, 7 and 8, the fluid passage housing 220 is formed as upper and lower housings 230 and 240 are coupled to each other to define the predetermined interior space 222 therebetween, although the fluid passage housing 220 may be formed of pipes, etc.

In the present embodiment, the upper housing 230 is formed with openings at locations beneath the ultrasonic vibrators 120, and the lower housing 240 is formed with nozzle seating openings 241 at locations beneath the ultrasonic vibrators 120 to allow the injection nozzles 260 to be seated thereon.

To achieve the water-tightness between the upper and lower housings 230 and 240, a sealing member, such as a housing gasket 250, may be interposed between the upper and lower housings 230 and 240. In the embodiment of the present invention as shown in FIG. 7, the housing gasket 250 is fitted on an upper end of a circumferential wall 245 of the lower housing 240 to be inserted into a groove 235 formed in a lower end of a circumferential wall of the upper housing 230.

Preferably, the raw water, received in the inner fluid passage of the fluid passage housing 220, comes into contact with at least part of the radiation plate 130, thereby serving to cool the radiation plate 130.

In particular, when the radiation plate 130 is configured to come into contact with the radiating elements of the oscillation circuit unit 110 as stated above, the heat, generated in the radiating elements 112, is transferred to the raw water through the radiation plate 130. This prevents over-heating of the oscillator module 100, specifically, the oscillation circuit unit 110. For the effective heat transfer, preferably, the radiation plate 130 is made of a highly thermally conductive material.

More preferably, the openings 231 are formed at the top of the fluid passage housing 220 at locations beneath the ultrasonic vibrators 120 in order to allow the raw water to come into contact with the radiation plate 130. That is, the radiation plate 130 is adapted to be cooled using the raw water that comes into contact with the ultrasonic vibrators 120, but the present invention is not limited thereto. Alternatively, the openings, formed at the top of the fluid passage housing 220, may be positioned so that the radiation plate 130 comes into contact with the raw water immediately beneath the radiating elements 112 to thereby be cooled.

Referring to FIGS. 7 and 8, the fluid passage housing 220 has trapezoidal partitions 242 having a predetermined height. The partitions 242 are formed around the respective nozzle seating openings 241. When the partitions 242 are provided in the fluid passage housing 220, the raw water, introduced from the raw water inlet portion 210, first gradually fills the interior space 222 from a bottom surface 221 of the fluid passage housing 220, and then, overflows the partitions 242 to thereby be supplied into the injection nozzles 260. Arrows shown in FIGS. 7 and 8 clearly show the flow of the raw water as stated above.

As a result of allowing the raw water to overflow the partitions 242 to thereby be uniformly distributed from the entire upper ends of the partitions 242, the raw water is able to be supplied into the injection nozzles 260 in a substantially laminar flow form. This also has the effect of allowing the vibrational energy, generated in the ultrasonic vibrators 120, to be uniformly applied to the raw water. Thereby, the wash water, injected from the injection nozzles 260, has uniform vibrational energy, eliminating the bending risk of wash water streams.

To supply the raw water into the injection nozzles 260 in a more stabilized laminar flow form, the fluid passage housing 220 and/or the injection nozzles 260 may have fluid passage stabilizing guides 232 and 265 to stabilize the flow of the inlet raw water.

The fluid passage stabilizing guides 232, formed at the fluid passage housing 220, may be integrally formed with the upper or lower housing 230 or 240, or may be formed as separate members.

In the embodiment of the present invention, as shown in FIGS. 6 and 8, the fluid passage stabilizing guides include a plurality of first guides 232 to supply the raw water from the raw water inlet portion 210 to the injection nozzles 260, and a plurality of second guides 265 to secondarily stabilize the raw water supplied into the injection nozzles 260. The plurality of first and second guides 232 and 265 are radially arranged about the respective injection nozzles 260. Alternatively, the fluid passage stabilizing guides 232 and 265 may be formed only at one side of the injection nozzles 260 or the fluid passage housing 220.

Referring to FIGS. 6 and 8, the fluid passage stabilizing guides 232 and 265 are radially arranged, but the present invention is not limited thereto. Admittedly, the fluid passage stabilizing guides may have other appropriate arrangements in consideration of the shape of the inner fluid passage, and the flow rate and pressure of the raw water.

The first guides 232 serve not only to disperse the flow of the raw water supplied from the raw water inlet portion 210 to allow the raw water to be introduced into the injection nozzles 260 at the constant flow rate and pressure, but also to allow the raw water to be guided from the upper ends of the partitions 242 into the injection nozzles 260 at the constant flow rate and pressure.

In the present invention, the raw water is able to be introduced into the injection nozzles 260 at an increased flow rate by virtue of channels 137 formed at the upper ends of the partitions 242 (See FIGS. 4, 5 and 9). The channels 137 act to instantaneously increase the flow rate of the raw water to be introduced into the injection nozzles 260, thereby ensuring effective discharge of bubbles generated around the ultrasonic vibrators 120 to the outside. Such removal of the bubbles can improve contact efficiency between the ultrasonic vibrators 120 and the raw water and can eliminate application of load to the vibrators.

As shown in FIG. 4, the channels 137 may be formed at the connector portions 135 on a lower surface of the radiation plate 130, but the present invention is not limited thereto. Alternatively, the channels 137 may be indented into the upper ends of the partitions 242. Also, although the present invention illustrates and explains that each of the injection nozzles 260 has two channels 137, the number and shape of the channel 137 is not limited to this description.

FIG. 9 illustrates a connected state between the oscillator module 100 and the injector module 200 of the ultrasonic washing apparatus 300 according to the present invention. The dotted portion of FIG. 9 denotes a space of the injector module 200 into which the raw water is supplied during operation of the washing apparatus 300.

As shown in FIGS. 7 to 9, the raw water, introduced from the raw water inlet portion 210, is stabilized to have a laminar flow form while passing through the first guides 232, thereby gradually filling the fluid passage housing 220 from the bottom surface 221 thereof. After completely filling the fluid passage housing 220, the raw water overflows the partitions 242 via the channels 137 formed at the upper ends of the partitions 242 to thereby be supplied into the injection nozzles 260, thereby acting to discharge the bubbles around the ultrasonic vibrators 120 to the outside. Then, the raw water is secondarily stabilized while passing through the second guides 265, thereby being discharged to the outside with uniform vibrational energy.

Preferably, the raw water inlet portion 210 vertically extends down to the bottom surface 221 as long as possible to allow the raw water to gradually fill the fluid passage housing 220 from the bottom surface 221 thereof.

The injection nozzles 260 are mounted in the nozzle seating openings 241 of the fluid passage housing 220 immediately beneath the ultrasonic vibrators 120, and are kept in a water-tight state through the use of sealing members, such as nozzle gaskets 270.

Preferably, a plurality of the injection nozzles 260 is provided to effectively wash a target object over a relatively wide range.

Although FIGS. 4 to 8 illustrate only two injection nozzles, the present invention is not limited thereto. For example, three injection nozzles may be arranged at intervals of 120 degrees.

When the plurality of injection nozzles 260 are provided, the ultrasonic vibrators 120 are located immediately above the respective injection nozzles 260 to apply the ultrasonic vibrational energy to the raw water introduced into an interior space 263 of each of the injection nozzles 260. The oscillation circuit unit 110 is configured to correspond to the plurality of ultrasonic vibrators 120.

In the present invention, each of the injection nozzles 260 may have only one injection hole, or a plurality of injection holes.

FIG. 10 is a plan view illustrating the injection nozzle 260 having a center injection hole 261 and four peripheral injection holes 262.

As shown in FIG. 10, when a plurality of the injection holes 261 and 262 are formed, it enables the wash water to be injected over a relatively wide range, resulting in enhanced washing efficiency. However, when being used with a conventional ultrasonic vibrator, the plurality of injection holes 261 and 262 may cause a problem in that the ultrasonic vibrational energy is concentrated on the center injection hole, causing deterioration in the transmission of the ultrasonic vibrational energy through the peripheral injection holes. This reduces washing effect in a wide area.

Figure 11:
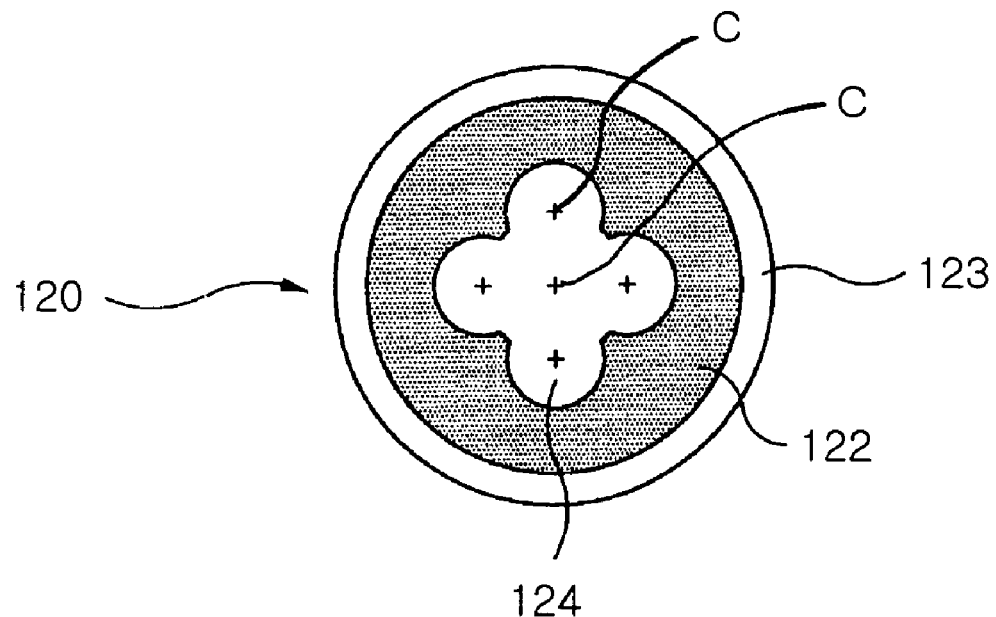
FIGS. 11a and 11b are a plan view and a longitudinal sectional view illustrating an ultrasonic vibrator according to the embodiment of the present invention.
Figure 11:
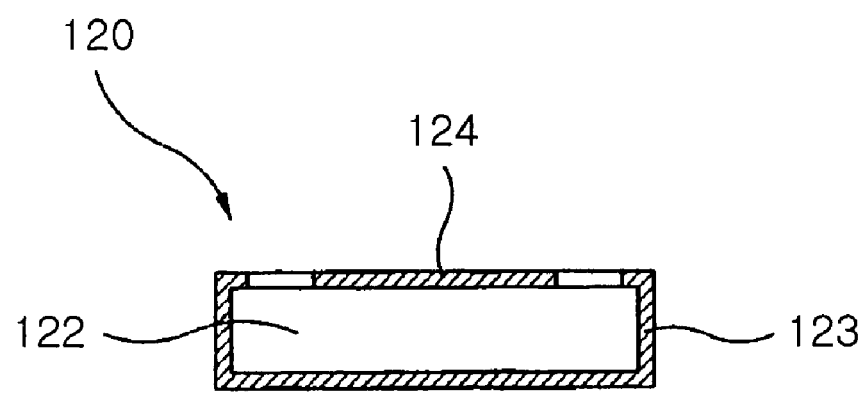

To solve the above problem, in the embodiment of the present invention as shown in FIG. 11, the electrodes of the ultrasonic vibrators 120 have the same number and location as those of the injection holes 261 and 262 of the injection nozzles 260.

That is, as shown in FIG. 11, to achieve uniform distribution of the ultrasonic vibrational energy, each of the vibrators 120 is configured to have a plurality of electrodes 124, which have center points C correspond to center portions of the plurality of injection holes 261 and 262 of the respective injection nozzles 260.

Referring to FIG. 11, the ultrasonic vibrator 120 has a piezoelectric ceramic body 122. Four electrodes 124, in the form of a four-leaf clover, as well as a peripheral electrode 123 are formed at the piezoelectric ceramic body 122. Preferably, the electrodes 124 are symmetrically arranged about the center of the body 122 to transmit the uniform ultrasonic vibrational energy.

Forming the electrodes 124 of the vibrator 120 to have the same number and location as those of the injection holes 261 and 262 of the injection nozzle 260 provides an advantage of supplying wash water having uniform vibrational energy as shown in FIG. 12.

Admittedly, the shapes of the electrodes 124 of the vibrator 120 and the injection holes 261 and 262 are not limited to the above description. For example, when the injection nozzle 260 has the center injection hole 261 and only three peripheral injection holes 262 as shown in FIG. 13b, the electrodes 124 having a three-leaf clover shape as shown in FIG. 13a are usable.

In addition, other ultrasonic vibrators having various shapes of electrodes 124 as shown in FIGS. 14a to 14c may be utilized.

As can be easily understood from the above description, the ultrasonic washing apparatus 300 of the present invention consists of the oscillator module 100 and the injector module 200. This modular structure is effective to reduce the overall size of the washing apparatus 300, allowing convenient washing operation in a domestic sink.

The modular structure of the washing apparatus 300 also allows a simplified assembly operation, and provides ease of repair and exchange of the oscillator module 100 or the injector module 200 when at least one of them is damaged.

Further, in the present invention, both the ultrasonic vibrators 120 and the oscillation circuit unit 110 form a single module. This has the effect of simplifying tuning thereof.

Alternatively, the oscillator module 100 and the injector module 200 may be integrally formed with each other. As an example, the oscillation circuit unit 110, the ultrasonic vibrators 120, the radiation plate 130, the fluid passage housing 220 and the injection nozzles 260 may be mounted in a single housing.

Of course, even in the case of the integral structure, the present invention can realize the advantages of improved radiation efficiency, uniform supply of wash water, etc.

As is apparent from the above description, the present invention provides a domestic injection-type ultrasonic washing apparatus having the following effects.

Firstly, according to the present invention, an oscillator device and an injector device have a modular structure. This has the effect of reducing the size of the washing apparatus, achieving a simplified assembly structure. Also this modular structure ensures ease of repair and exchange of damaged modules and facilitates tuning of vibrators and oscillation circuit units.

Secondly, by virtue of a minimized distance between the oscillation circuit unit and the ultrasonic vibrators, according to the present invention, it is possible to minimize deterioration in the transmission of driving voltage and signals, thereby achieving improved oscillation efficiency, and to reduce manufacturing costs of the apparatus through the use of a general electric wire instead of a coaxial cable.

Thirdly, effective cooling of the oscillation circuit unit achieves improved radiation efficiency, enabling stable management of elements of the oscillation circuit unit.

Fourthly, according to the present invention, partitions and fluid passage stabilizing guides are provided to achieve stable injection of wash water.

Fifthly, electrodes of the vibrators have the same shape and location as injection holes of injection nozzle. This has the effect of allowing wash water to be injected with constant vibrational energy.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A domestic injection-type ultrasonic washing apparatus comprising:

an oscillator module including an oscillation circuit unit having various elements electrically connected to an exterior power source to generate electric vibration, ultrasonic vibrators located underneath the oscillation circuit unit and electrically connected to the oscillation circuit unit to convert the electric vibration to mechanical vibration, and a radiation plate having vibrator seating openings for the mounting of the ultrasonic vibrators; and an injector module mounted underneath the oscillator module, the injector module including a raw water inlet portion for the introduction of exterior raw water, a fluid passage housing having a predetermined inner space, at least part of an upper portion of the fluid passage housing being opened to define an inner fluid passage, through which the raw water, introduced from the raw water inlet portion, passes while coming into contact with the radiation plate, and injection nozzles mounted in nozzle seating openings of the fluid passage housing beneath the ultrasonic vibrators and adapted to inject the raw water, passed through the inner fluid passage, to the outside;

wherein the fluid passage housing has partitions having a predetermined height around the nozzle seating openings, so that the raw water, introduced from the raw water inlet portion, gradually fills the fluid passage housing from a bottom surface of the housing, and then overflows the partitions to thereby be introduced into the injection nozzles;

wherein channels are formed at upper ends of the partitions to increase a flow rate of the raw water to be introduced into the injection nozzles; and wherein the fluid passage housing or each injection nozzle has fluid passage stabilizing guides to stabilize the flow of the raw water to be introduced into the fluid passage housing or the injection nozzle.

2. The apparatus as set forth in claim 1, wherein:
the injector module has two or more injection nozzles; and
the oscillator module has the vibrators positioned above the injection nozzles to correspond to the injection nozzles, respectively.

3. The apparatus as set forth in claim 1, wherein the oscillator module is provided with sealing members at connector portions thereof to be connected to the injector module to achieve water-tightness relative to the injector module.

4. The apparatus as set forth in claim 1, wherein at least one of radiating elements, provided at the oscillation circuit unit, comes into contact with the radiation plate.

5. The apparatus as set forth in claim 1, wherein the fluid passage housing includes:
an upper housing formed with openings at locations beneath the vibrators; and a lower housing formed with the nozzle seating openings beneath the vibrators.

6. A domestic injection-type ultrasonic washing apparatus comprising:
an oscillator module including an oscillation circuit unit having various elements electrically connected to an exterior power source to generate electric vibration, ultrasonic vibrators located underneath the oscillation circuit unit and electrically connected to the oscillation circuit unit to convert the electric vibration to mechanical vibration, and a radiation plate having vibrator seating openings for the mounting of the ultrasonic vibrators: and
an injector module mounted underneath the oscillator module, the injector module including a raw water inlet portion for the introduction of exterior raw water, a fluid passage housing having a predetermined inner space, at least part of an upper portion of the fluid passage housing being opened to define an inner fluid passage, through which the raw water, introduced from the raw water inlet portion, passes while coming into contact with the radiation plate, and injection nozzles mounted in nozzle seating openings of the fluid passage housing beneath the ultrasonic vibrators and adapted to inject the raw water, passed through the inner fluid passage, to the outside;
wherein each of the injection nozzles has a plurality of injection holes; and each of the vibrators has a plurality of electrodes each having a center point that corresponds to a center portion of each injection hole for the uniform dispersion of ultrasonic energy.

7. The apparatus as set forth in claim 6, wherein the fluid passage housing has partitions having a predetermined height around the nozzle seating openings, so that the raw water, introduced from the raw water inlet portion, gradually fills the fluid passage housing from a bottom surface of the housing, and then, overflows the partitions to thereby be introduced into the injection nozzles.

8. The apparatus as set forth in claim 7, wherein channels are formed at upper ends of the partitions to increase a flow rate of the raw water to be introduced into the injection nozzles.

9. The apparatus as set forth in claim 7, wherein the fluid passage housing or each injection nozzle has fluid passage stabilizing guides to stabilize the flow of the raw water to be introduced into the fluid passage housing or the injection nozzle.

10. A domestic injection-type ultrasonic washing apparatus comprising:
an oscillation circuit unit having various elements electrically connected to an exterior power source to generate electric vibration;
ultrasonic vibrators located underneath the oscillation circuit unit and electrically connected to the oscillation circuit unit to convert the electric vibration to mechanical vibration;
a radiation plate having vibrator seating openings for the mounting of the ultrasonic vibrators;
a fluid passage housing having a predetermined inner space, at least part of an upper portion of the fluid passage housing being opened to define an inner fluid passage, through which inlet raw water from the outside passes while coming into contact with the radiation plate; and
injection nozzles mounted in nozzle seating openings of the fluid passage housing beneath the ultrasonic vibrators and adapted to inject the raw water, passed through the inner fluid passage, to the outside;
wherein the fluid passage housing has partitions having a predetermined height around the nozzle seating openings, so that the raw water, introduced from the raw water inlet portion, gradually fills the fluid passage housing from a bottom surface of the housing, and then overflows the partitions to thereby be introduced into the injection nozzles;
wherein channels are formed at upper ends of the partitions to increase a flow rate of the raw water to be introduced into the injection nozzles; and
wherein the fluid passage housing or each injection nozzle has fluid passage stabilizing guides to stabilize the flow of the raw water to be introduced into the fluid passage housing or the injection nozzle.

11. The apparatus as set forth in claim 10, wherein:
two or more injection nozzles are provided; and
the vibrators are positioned above the injection nozzles to correspond to the injection nozzles, respectively.

12. The apparatus as set forth in claim 10, wherein at least one of radiating elements, provided at the oscillation circuit unit, comes into contact with the radiation plate.

13. A domestic injection-type ultrasonic washing apparatus comprising:
an oscillation circuit unit having various elements electrically connected to an exterior power source to generate electric vibration;
ultrasonic vibrators located underneath the oscillation circuit unit and electrically connected to the oscillation circuit unit to convert the electric vibration to mechanical vibration;
a radiation plate having vibrator seating openings for the mounting of the ultrasonic vibrators;
a fluid passage housing having a predetermined inner space, at least part of an upper portion of the fluid passage housing being opened to define an inner fluid passage, through which inlet raw water from the outside passes while coming into contact with the radiation plate; and
injection nozzles mounted in nozzle seating openings of the fluid passage housing beneath the ultrasonic vibrators and adapted to inject the raw water, passed through the inner fluid passage, to the outside:
wherein each of the injection nozzles has a plurality of injection holes; and each of the vibrators has a plurality of electrodes each having a center point that corresponds to a center portion of each injection hole for the uniform dispersion of ultrasonic energy.

14. The apparatus as set forth in claim 13, wherein the fluid passage housing has partitions having a predetermined height around the nozzle seating openings, so that the raw water, introduced from a raw water inlet portion, gradually fills the fluid passage housing from a bottom surface of the housing, and then, overflows the partitions to thereby be introduced into the injection nozzles.

15. The apparatus as set forth in claim 14, wherein the fluid passage housing or each injection nozzle has fluid passage stabilizing guides to stabilize the flow of the raw water to be introduced into the fluid passage housing or the injection nozzle.

16. The apparatus as set forth in claim 14, wherein channels are formed at upper ends of the partitions to increase a flow rate of the raw water to be introduced into the injection nozzles.

17. A domestic injection-type ultrasonic washing apparatus comprising an oscillation circuit unit having various elements connected to an exterior power source to generate electric vibration, ultrasonic vibrators electrically connected to the oscillation circuit unit to convert the electric vibration to mechanical vibration, and injection nozzles to ultrasonically vibrate and inject inlet raw water, further comprising:

a radiation plate having vibrator seating openings for the mounting of the ultrasonic vibrators and adapted to come into contact with radiating elements of the oscillation circuit unit; and a fluid passage housing having an inner fluid passage, through which the inlet raw water from the outside passes while coming into contact with the radiation plate;

wherein the fluid passage housing has partitions having a predetermined height around the nozzle seating openings, so that the raw water, introduced from the raw water inlet portion, gradually fills the fluid passage housing from a bottom surface of the housing, and then overflows the partitions to thereby be introduced into the injection nozzles;

wherein channels are formed at upper ends of the partitions to increase a flow rate of the raw water to be introduced into the injection nozzles; and wherein the fluid passage housing or each injection nozzle has fluid passage stabilizing guides to stabilize the flow of the raw water to be introduced into the fluid passage housing or the injection nozzle.

* * * * *

UNITED STATES PATENT AND TRADEMARK OFFICE
CERTIFICATE OF CORRECTION

PATENT NO.       : 7,581,553 B2                                    Page 1 of 1
APPLICATION NO.  : 11/271340
DATED            : September 1, 2009
INVENTOR(S)      : Kim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 919 days.

Signed and Sealed this

Fourteenth Day of September, 2010

David J. Kappos
*Director of the United States Patent and Trademark Office*